(12) United States Patent
Baskey et al.

(10) Patent No.: US 8,671,180 B2
(45) Date of Patent: Mar. 11, 2014

(54) METHOD AND SYSTEM FOR GENERIC APPLICATION LIVELINESS MONITORING FOR BUSINESS RESILIENCY

(75) Inventors: Michael Edward Baskey, Wappingers Falls, NY (US); Chun-Shi Chang, Poughkeepsie, NY (US); Lap Thiet Huynh, Cary, NC (US); Dinakaran Joseph, Apex, NC (US); Sambit Sahu, Hopewell Junction, NY (US); Dinesh Chandra Verma, Mount Kisco, NY (US); Michael D. Williams, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 1102 days.

(21) Appl. No.: 12/131,344

(22) Filed: Jun. 2, 2008

(65) Prior Publication Data

US 2008/0228873 A1    Sep. 18, 2008

Related U.S. Application Data

(63) Continuation of application No. 11/350,688, filed on Feb. 9, 2006, now abandoned.

(51) Int. Cl.
*G06F 15/173* (2006.01)
*G06F 3/00* (2006.01)

(52) U.S. Cl.
USPC ............ 709/224; 709/223; 719/328; 719/329

(58) Field of Classification Search
USPC .......................... 709/223, 224; 719/328, 329
See application file for complete search history.

(56) References Cited

U.S. PATENT DOCUMENTS

| | | | |
|---|---|---|---|
| 5,440,726 A | | 8/1995 | Fuchs et al. |
| 5,627,886 A * | | 5/1997 | Bowman ...................... 379/111 |
| 5,964,837 A | | 10/1999 | Chao et al. |
| 6,021,437 A * | | 2/2000 | Chen et al. ..................... 709/224 |
| 6,144,669 A | | 11/2000 | Williams et al. |
| 6,247,141 B1 | | 6/2001 | Holmberg |
| 6,434,624 B1 * | | 8/2002 | Gai et al. ....................... 709/232 |
| 2002/0049845 A1 | | 4/2002 | Sreenivasan et al. |
| 2002/0059423 A1 | | 5/2002 | Leymann et al. |
| 2003/0105850 A1 * | | 6/2003 | Lean et al. ..................... 709/223 |
| 2003/0126240 A1 * | | 7/2003 | Vosseler ........................ 709/221 |

* cited by examiner

*Primary Examiner* — Ranodhi Serrao
(74) *Attorney, Agent, or Firm* — Tutunjian & Bitetto, P.C.; Jennifer R. Davis (57) ABSTRACT

A system and method for monitoring liveliness includes a management device which has an application layer where applications are executed. A connection monitor is located other than on the application layer, and the connection monitor is configured to receive requests from clients and deliver the requests to components on the application layer. The components include a generic application monitor which responds to liveliness monitor requests from the clients for all applications monitored, and one or more applications which response to requests to that application.

14 Claims, 7 Drawing Sheets

METHOD AND SYSTEM FOR GENERIC APPLICATION LIVELINESS MONITORING FOR BUSINESS RESILIENCY

RELATED APPLICATION INFORMATION

This application is a Continuation application of U.S. patent application Ser. No. 11/350,688 filed Feb. 9, 2006, now abandoned incorporated herein by reference in it entirety.

BACKGROUND

1. Technical Field

The present invention relates to liveliness monitoring and more particularly to a system and method for generically monitoring liveliness across a plurality of different entities and/or applications.

2. Description of the Related Art

Business resiliency is a key need for enterprise applications. Business resiliency entails a continuous monitoring of the liveliness of applications, taking appropriate corrective steps, e.g. restarting an application, or migrating the application over to a backup site to ensure continued operation.

Business applications may be monitored for liveliness by running a heartbeat. In the heartbeat mechanism, a monitor, usually located at a management site in the network, periodically sends a dummy request to the application. If the application responds correctly, then the application is considered operational. If the application does not respond correctly, the application is considered to have failed and corrective action is taken.

When status of several applications needs to be monitored, an application monitor needs to be written for each type of application. While application monitors exist for some of the most widely used applications, creating an application monitor for several hundred types of applications that are used today is not practical.

Another complexity associated with current state of the art is that some applications are difficult to monitor for liveliness using remote monitors. As an example, with the current state of the art, a liveliness monitor for a trading application would create fake trades on the system to check for its liveliness. However, fake trades can cause side-effects, or trigger thresholds for other actions that may not be caused in the absence of the fake trades.

SUMMARY

Therefore, a generic application monitor which can check the status of any type of application will be of significant advantage to the business resiliency monitoring systems and is provided in accordance with the present invention.

A generic system for responding to an application monitor which would be able to send back the right responses to the monitor without perturbing the real application is needed. Therefore, a generic application liveliness responder which can respond to an application responder without affecting the real application will be of significant advantage to the business resiliency monitoring systems and is provided in accordance with the present invention A system and method for monitoring liveliness includes a management device which executes different types of application monitors. The generic application monitor consists of a message generator which leverages a set of message templates and request-response templates. The generic application monitor uses a set of parameters, applies them to the templates to create a set of messages to be exchanged with the application being monitored. It then uses a generic communication interface to send and receive those messages, and validates from the exchange that the application is indeed running. The generic application monitor can support different types of applications using different set of parameters.

A generic application liveliness responder includes a request router and a message responder. The request router is located in the communication path of the application (e.g. in the network communication stack of the operating system) and routes incoming messages to the real application or the message responder depending on the set of policies. The message responder checks the state of the application as indicated by operating system and network monitoring data available on the machine, and then responds back to the initiator of the message based on those readings.

A system for monitoring liveliness of an application includes a message generator for creating messages to be used for monitoring liveliness and a sequence generator for creating a sequence of messages to provide message exchanges for monitoring liveliness. A base monitor validates that the sequence of messages is exchanged with the application.

A method for monitoring liveliness of a monitored application includes creating a set of exchange messages, creating a sequence of exchange messages and validating the sequence of exchange messages by sending and receiving messages to/from the monitored application.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide an illustrative generic application liveliness monitor which can be used with any application for remote monitoring. This may result in substantial savings in that applications of different types can be monitored with a single probe.

Embodiments of the present invention further provide an illustrative generic application liveliness responder which can be used to respond back to monitors. This has the advantage that liveliness of applications that cannot be monitored directly can also be determined.

Operation of a generic application liveliness responder may include providing a network stack level agent on a monitored server which can respond to heartbeat messages from a remote management server. The network stack agent has policies on which types of applications the agent should respond from, and which type of probe messages should be forwarded to the applications directly. The policies permit the network stack agent to act as a proxy for different applications without modifying the application or requiring additional work to be performed by an application. The network stack agent also checks on the network and operating system stack of the application to respond to the monitoring agent.

The generic application monitor system is able to handle a heart-beat mechanism for any type of application, even applications which cannot take synthetic traffic, applications for which a monitoring agent does not exist, etc. This saves on the number of agents, and the cost of developing and deploying a business resiliency solution.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
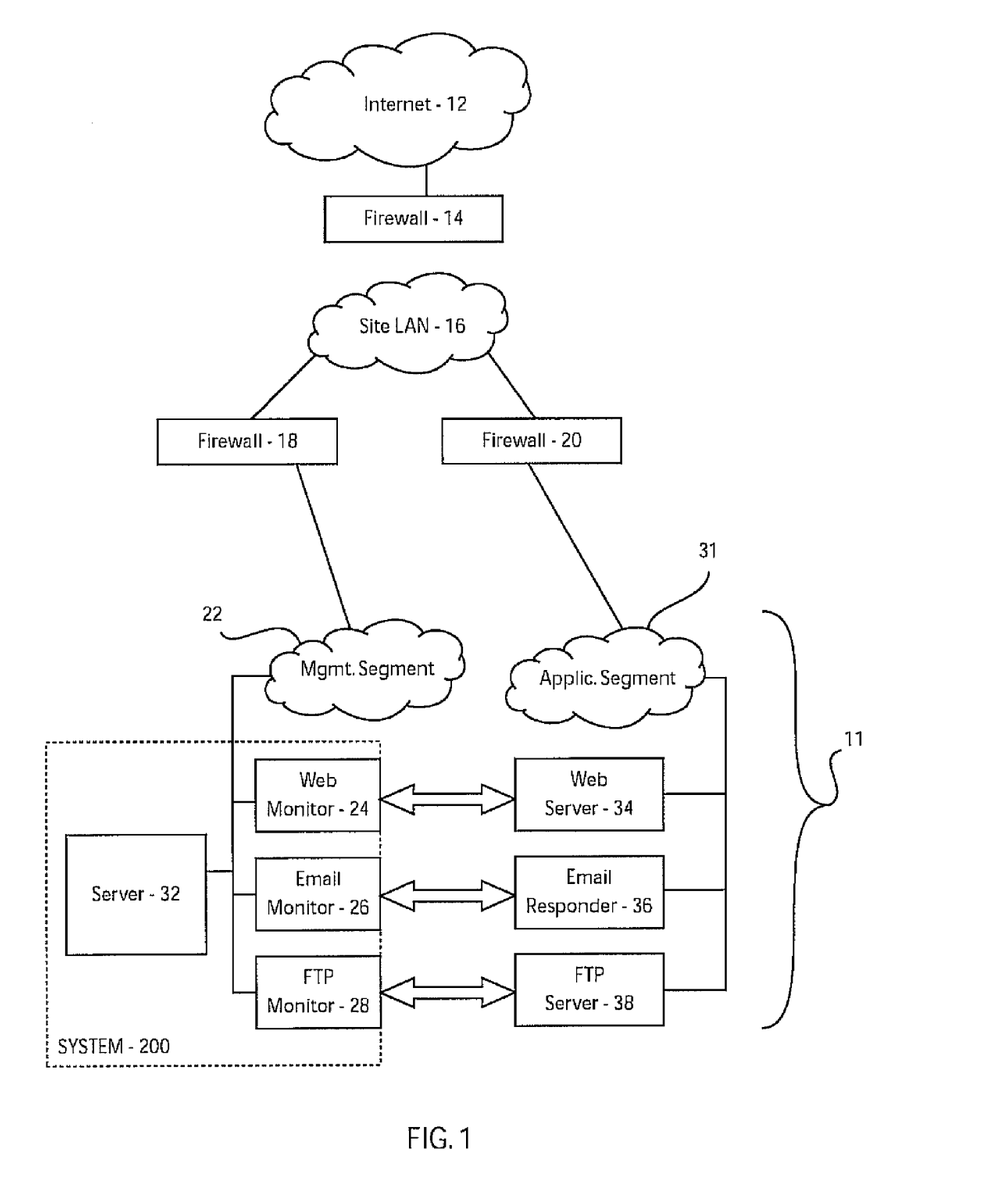
FIG. 1 is a block diagram showing an environment of a data center where application liveliness monitoring is needed, and the present invention may be implemented.

Referring now to the drawings in which like numerals represent the same or similar elements and initially to FIG. 1, a block/flow diagram shows an illustrative environment 10 where the present invention can be used. This environment is found in many data centers that host a variety of applications on servers. A data center may be connected to the Internet 12 through a firewall 14. Internally, the data-center includes several local area network (LAN) segments (e.g., 22, 31), which are all interconnected by another LAN segment, e.g., site LAN 16. Each of the LAN segments 22, 31 are generally protected by means of individual dedicated firewalls 18, 20 respectively.

In FIG. 1, two LAN segments, a Management LAN Segment 22 and an Application LAN Segment 31 are illustratively shown. The Application LAN Segment 31 is used to connect different types of applications. FIG. 1 shows three such applications hosted on three independent servers, namely a web-server 34, an email responder 36 and a FTP server 38. Each of these applications runs on their dedicated hardware boxes. The management LAN Segment 22 may have computers that run management applications. A computer 32 may connect to the LAN which runs three different types of monitors, a web monitor 24, an email monitor 26, and a FTP monitor 28.

The web monitor 24 periodically checks the liveliness of the web-server, the email monitor server 26 periodically checks the liveliness of the email responder 36, and the FTP monitor 28 checks the liveliness of the FTP server 38. However, other uses and applications may benefit from the use and monitoring of a generic heartbeat as described herein. For example, networks may include cable, networks, satellite networks, cellular or other telephone networks, LANs, etc. The site may be structured differently, with monitors and applications being located in the same LAN segment, or the management segment being located on a remote site connecting via the Internet or another type of network.

Each application monitor 24, 26, and 28 periodically may generate a synthetic request to the application 34, 36 and 38 it is monitoring. The successful response from the application 34, 36, 38 would declare the application to be up, and the failure to respond for a predetermined number of specific requests would declare an application to be down. When an application is determined to be down, a recovery action is triggered.

In conventional systems, one instance of an application monitor is employed for each application. A significant problem with the management infrastructure of such a system is the need to create a monitor for each application that is running on the system. A typical information technology (IT) system runs tens to hundreds of applications, and creating a new application monitor for each application would take a significant amount of effort. A generic monitor that can monitor many different types of applications would significantly save on this effort, but is not found in the current state of the art because each application needs a different sequence of messages for liveliness checking, needs a different encoding on messages on the wire, and uses different types of protocol.

Figure 2:
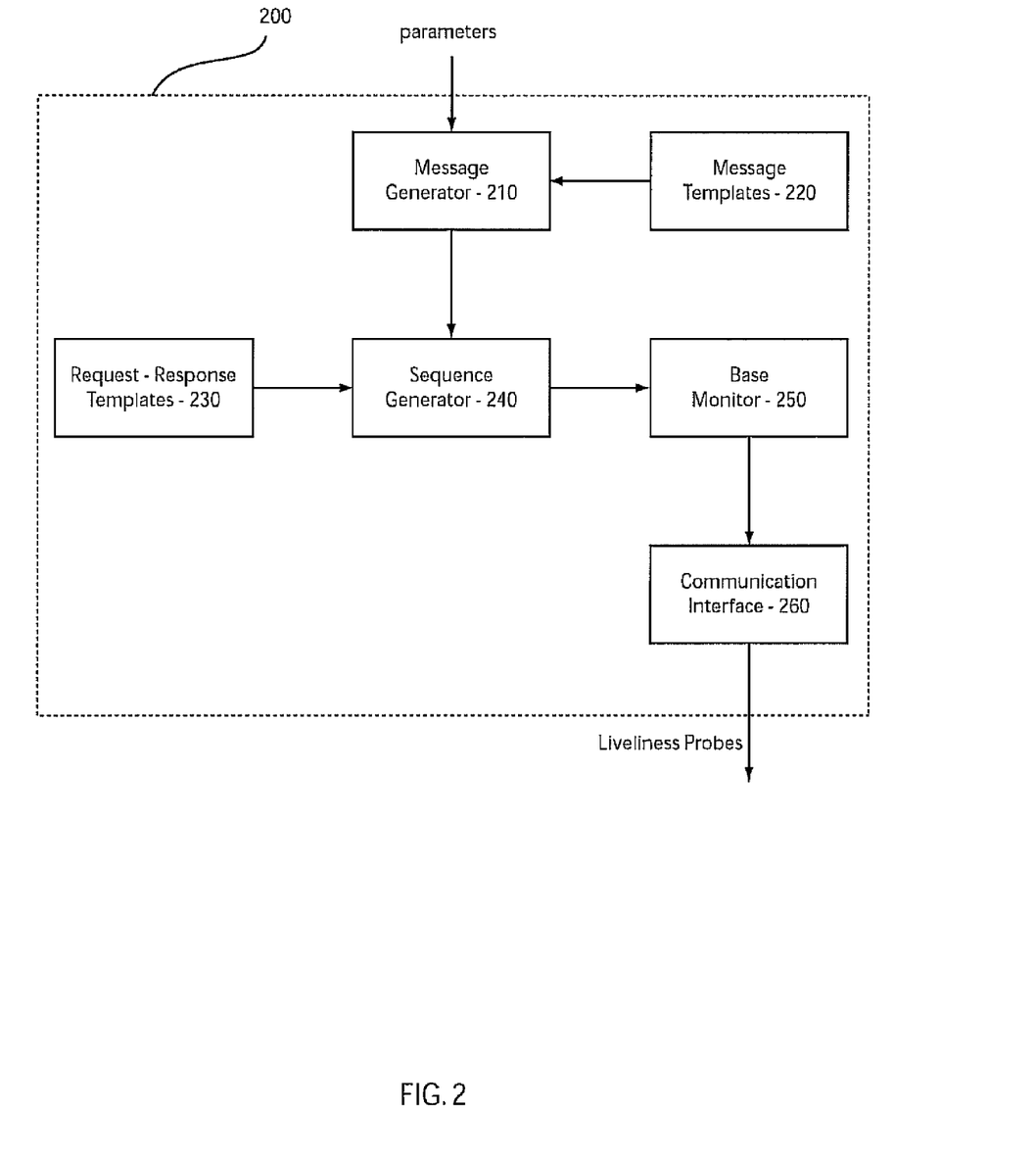
FIG. 2 is a block diagram showing a generic application monitor in accordance with an embodiment of the present invention.

The present invention provides a way to resolve those difficulties and to create a generic application monitor 200 to replace all or part of the monitors.

Referring to FIG. 2 with continued reference to FIG. 1, a structure of a generic application monitor is included in accordance with an illustrative embodiment of the present invention. In one embodiment, a system 200 with a generic monitor included replaces server 32 and one or more monitors (24, 26, 28, etc.) at a particular site 11. In a preferred embodiment, all monitoring provided by the management segment 22 of a system is replaced by the generic application monitoring system 200 as illustratively depicted in FIG. 1. System 200 may therefore handle all monitoring requests at the site 11 or throughout a portion of the network 16 or throughout the entire network 12 depending on the capabilities available. System 200 is described in greater detail herein.

Referring to FIG. 2, the generic application monitor 200 includes a message generator 210, a set of message templates 220, a set of request-response templates 230, a sequence generator 240, a base monitor 250, and a communication interface 260. The message generator 210 takes a set of parameters as input, such parameters could be the IP address or machine name of the application being monitored, the port on the destination machine to be used for communication, the protocol to be used for the communications the listing of some fields in messages to be used, e.g. the URL for a web application, or the account number for a transaction processing application, and any transformations or encoding to be used on the parameters before using them on the message template.

The message generator 210 uses the set of message templates 220 to create messages based on these parameters. As an example, the message template for a web-based application may leave a place-holder for the URL field, and the message generator 210 can fill in the value of the field from the parameter value that is provided. One of the parameters could indicate which message template of which specific sequence of message exchanges ought to be used for communication.

Once the fully specified messages are created, the message generator 210 feeds these messages and a subset of parameters to the sequence generator. The sequence generator 240 consults the set of sequence templates to determine what types of message exchanges need to be done to validate the liveliness of a monitor. A sequence may specify sending a request message to the remote application, and receiving a response message back. Other sequences may send a series of three requests, each obtaining an "OK" response in return, and then sending a fourth request, which should return a specific message with a parameter value in a designated field in the response. The sequence templates are fitted in with specific messages to obtain a message sequence that can be performed to validate liveliness. The message sequence is passed on to the base monitor 250 which sends all the request messages in the sequence, receives the responses and checks that the response message matches the responses expected in the sequence. The exchange is done over a common communication interface 260. In an Internet based embodiment, the common communication interface 260 could be the standard socket programming interface.

Figure 3:
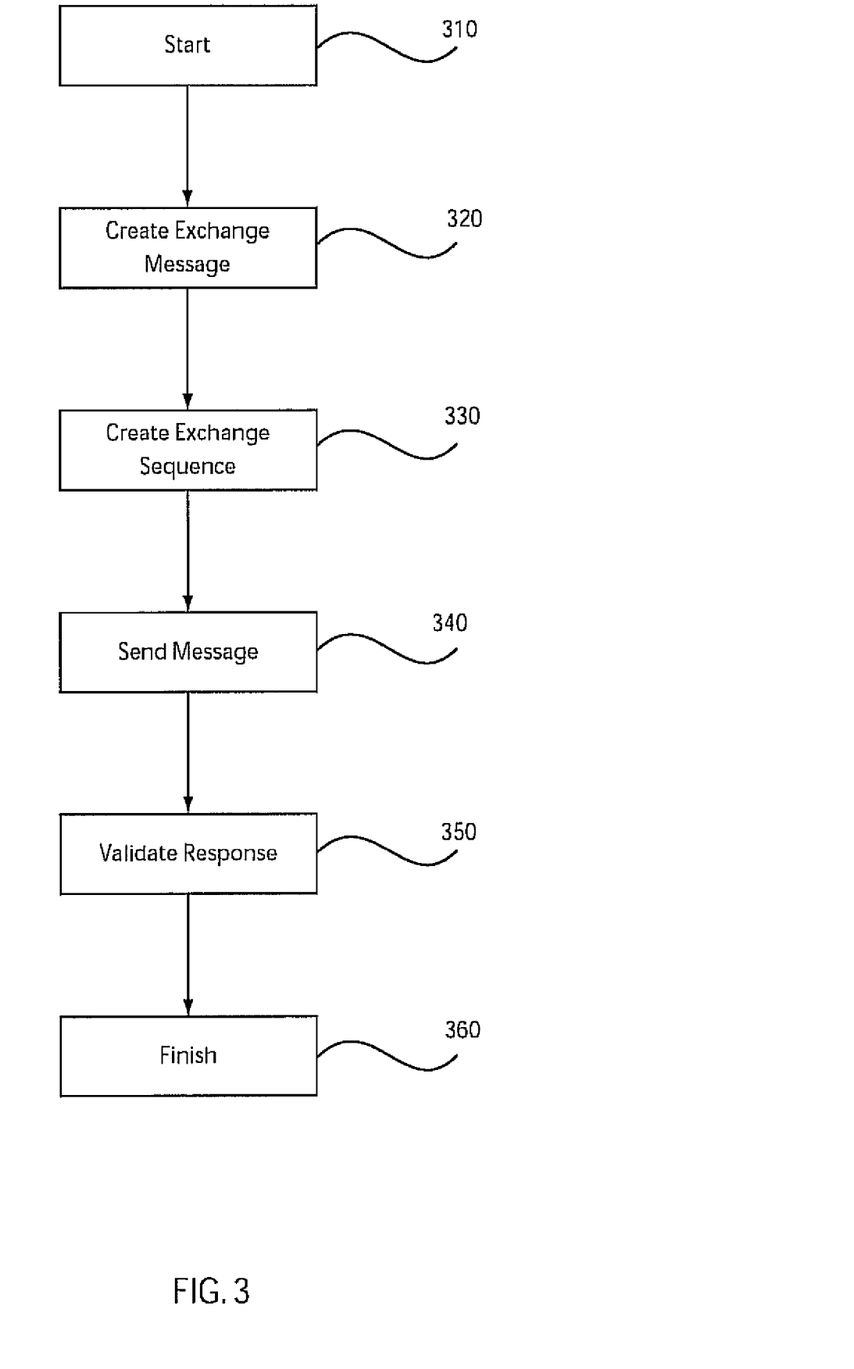
FIG. 3 is a flow diagram showing a process for generic application monitoring in accordance with an embodiment of the present invention.

Referring to FIG. 3, a flow-chart shows an algorithm employing the generic liveliness monitor. The process is entered in block 310 when the liveliness of an application needs to be checked. This could be done on a manual invocation, or by an automated script at periodic or other time intervals. In block 320, the parameters specified by the user are combined with message templates to create a set of exchange messages. In block 330, the exchange messages are combined with a sequence template to create an exchange sequence. In block 340, the exchange sequence messages are sent out to the application being monitored and the responses are received. In block 350, the responses are compared with the expected response from the message sequence. If the expected sequence is obtained, the application is considered alive. If the expected sequence is not obtained, the application is considered faulty. The program terminates in block 360.

Manageability and other problems arise when liveliness monitors are used for some types of applications. These problems could arise with the use of application-specific monitors, or with the use of a generic monitor. For example, in the case of a bank transaction system synthetic traffic is generated by creating fake accounts.

Creating and managing these fake systems requires the customization of applications and other monitoring schemes, since these accounts would need to be excluded from regular accounting and other applications. Furthermore, whenever new applications are developed, they have to make provisions to permit monitoring of the fake accounts. This is not only cumbersome, but costly. In addition, not all applications can be monitored successfully with synthetic traffic.

In addition, monitoring applications often requires the loss of computing resources and/or reduction in performance since a heartbeat request or other criteria requires attention, which takes the application away from other tasks.

Figure 4:
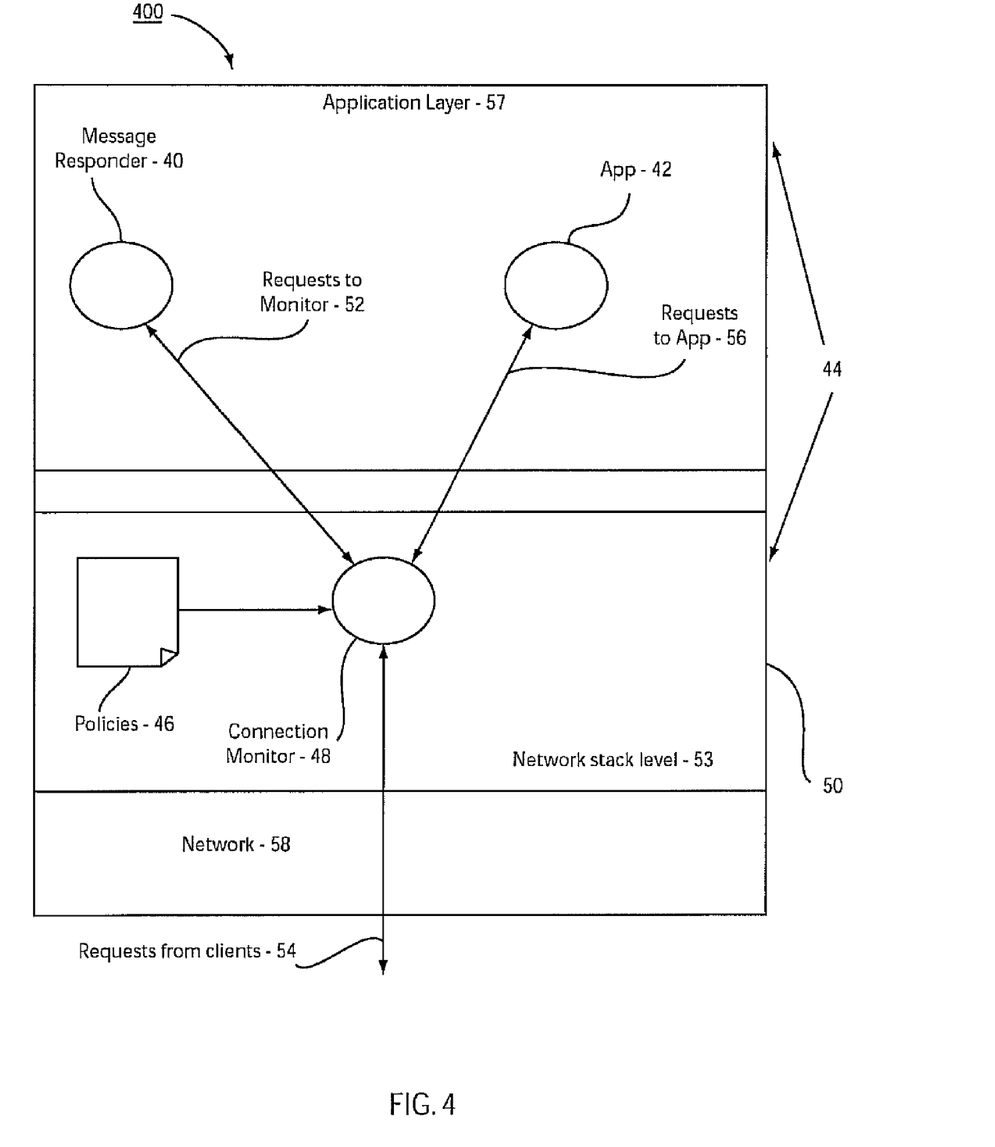
FIG. 4 is a diagram showing a connection monitor and a generic application monitor used for liveliness monitoring in accordance with an embodiment of the present invention.

Referring to FIG. 4, in accordance with the present invention, a generic application liveliness responder 40 is provided which checks the liveliness/activity of all applications or a portion or all applications in a system or network, and can respond back to an application monitor. The responder 40 runs on the same system as the application being monitored. Advantageously, the responder's operation is performed in such a way as to not interfere with the application's main tasks.

A liveliness monitoring system 400 is shown in accordance with one illustrative embodiment. FIG. 4 shows a server 44, which includes an applications layer 57 and an operating system layer 50. Operating system layer 50 includes a network stack 53, which is responsible for a communication protocol between a network 58 and an application 42.

In this embodiment, a generic application liveliness responder may include message responder 40, and a connection monitor 48. The generic application liveliness responder is preferably a policy enabled application running on server 44. Policies 46 provide information on how and what to respond on behalf of an application 42. Policies 46 are updated in accordance with the applications and functions of the system. As applications are added to the system or network, the policies 46 are updated. The policy enabled connection monitor operates at the network stack level 53. In this way, dealing with requests and responses for liveliness updates is not dealt with in the application layer 57. Therefore, an application 42 is unaffected by requests to monitor 52. Monitor 40 may be implemented as an independent process outside of network stack layer 53.

Connection Monitor 48 intercepts requests received at the network stack level depending on the policies 46 that are defined for the server 44, and can forward the messages to either the application 42 or the message responder 40. The message responder 40 can respond back to a selected set of probes on behalf of the application 42. A single monitor 48 can be used to track different types of applications. The message responder 40 can be implemented in a generic manner that can respond on behalf of many different applications, or be designed as a responder for a specific application.

The response to a monitoring request would check the following before responding: a) That the port on which the originating application was listening is in use and bound to an process on the system; b) That the process of the system from operating system (OS) tables or otherwise is shown to be active; and c) That the amount of network traffic inbound to the network traffic outbound is within a predetermined range showing that the application is actively exchanging network communication. Otherwise, the process is considered dead and no response is sent out. Other checks can also be added or the checks may be supplemented or have tailored responses desponding on, for example, the policies (46) maintained.

The message responder 40 could be running on a separate port where requests can be sent. Connection monitor 48 receives the queries 54 from client devices or applications and responds back to them. The connection monitor may be a generic monitor, which sends requests to the generic application monitor 40 on the port and provides a port number (or other address or location information) on which the application sending the request (54) should be running.

The system 400 preferably provides the network stack 53 to forward requests to the generic application monitor 40 on the basis of pre-determined policies 46, e.g. when the requests (54) come from clients or servers, the request is forwarded to the generic application monitor 40 instead of the application 42.

Advantageously, a generic application monitor 40 runs on the application level 57 along with any applications 42. The connection monitor 48 operates or a network stack (operating system level) or at a different an independent level than the application level 57. In this way, requests from client 54 are dealt with and routed appropriately, which do not interfere with the applications (42) running on a server 44. Generic application monitor 40 handles monitor requests 52 and application 42 handles only the requests 56 to that application 42.

In the event that more applications or devices that need monitoring are brought on-line or removed, policies 46 are simply updated to accommodate the changes.

Figure 5:
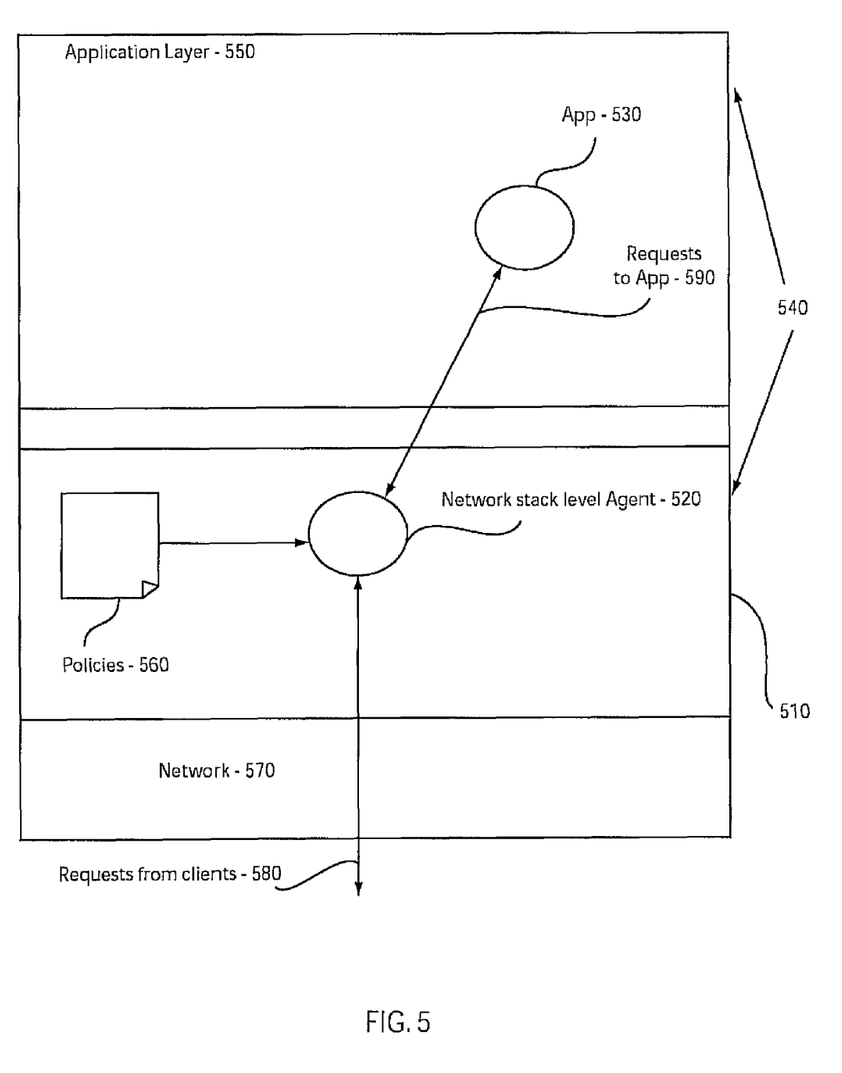
FIG. 5 is a diagram showing a network stack level agent used for liveliness monitoring in accordance with another embodiment of the present invention.

Referring to FIG. 5, an alternate embodiment of the generic application liveliness responder is shown. A server 540 includes an applications layer 550 and an operating system layer 510. Operating system layer 510 includes a network stack, which is responsible for a communication protocol between a network 570 and an application 530.

In this embodiment, the generic application liveliness responder includes simply a network stack level agent 520. The network stack level agent 520 intercepts all incoming packets 580 at the server, and determines whether they should be forwarded to application 530 using a set of policies 560. If the policies 560 so dictate, the network stack level agent 520 sends a response back to the origination node.

The system preferably provides the network stack 510 to forward requests to the network stack level agent 520 on the basis of pre-determined policies 560, e.g., when the requests (580) come from clients, and not from an application monitor. The request is forwarded to the application 530, and when the request 580 comes from an application monitor, the request is responded to by the network level stack agent 520.

Figure 6:
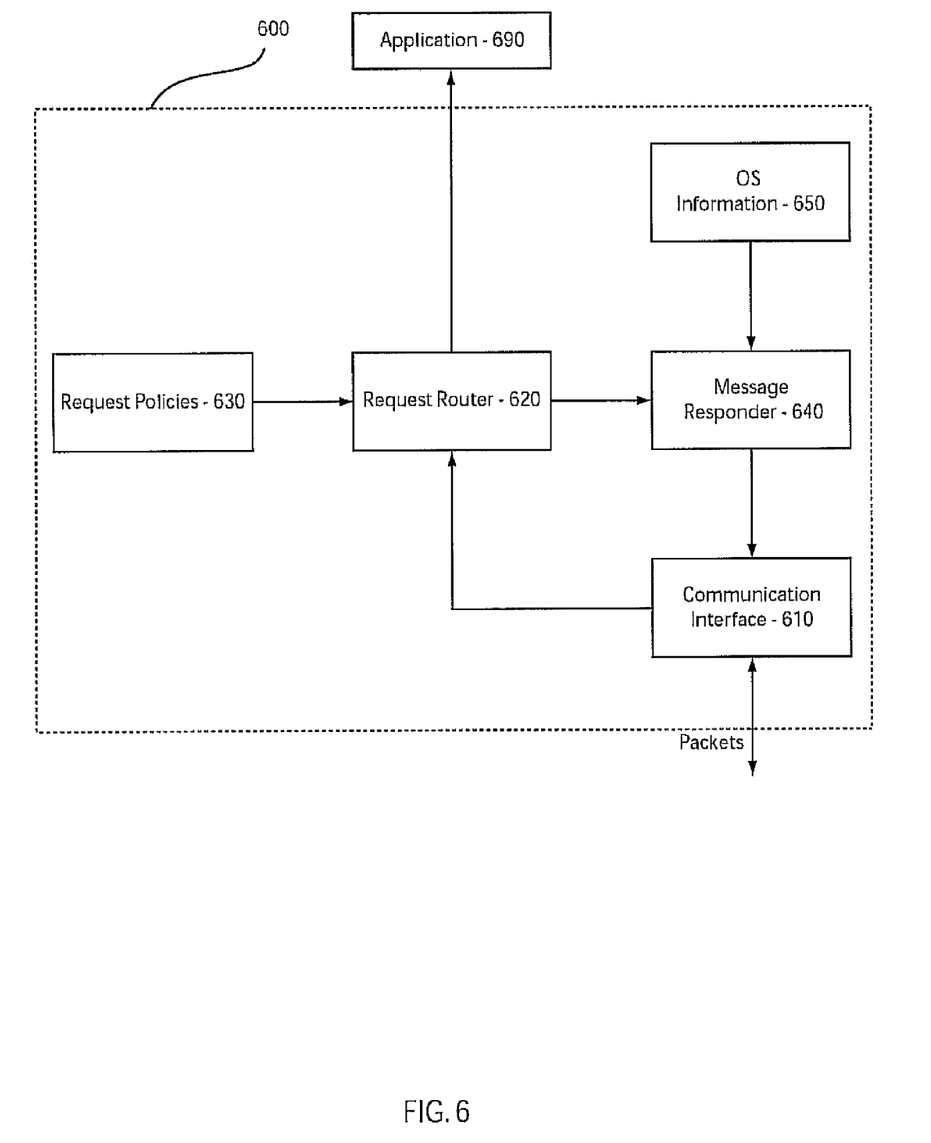
FIG. 6 is a block diagram showing a generic application liveliness responder in accordance with an embodiment of the present invention.

Referring to FIG. 6, a structure/apparatus for a generic application liveliness responder is illustratively shown. A generic application liveliness responder 600 comprises a request router 620, a message responder 640, operating system (OS) information block 650, a set of request policies 630, and a communication interface 610. The communication interface 610 is used to send and receive packets or messages from a network according to any network communication protocol. The request router 620 examines all packets received in this manner to determine whether they should be forwarded to an application 690 being monitored, or whether they should be forwarded to the message responder 640. The determination is made on the basis of the set of request policies 630.

Packets received from an application liveliness monitor are sent to the message responder 640 while packets sent from other sources are sent to the application 690. The message responder 640 looks at the information about the state of the application 690 in the Operating Systems available from the OS information 690 to make a determination as to whether the application 690 is alive or not. OS information 690 may include information about the state of the process running application 690 maintained in tables of the Operating system, network packet statistics, and resource usage information of the process. The message responder 640 then sends a response to the application monitor through the communication interface 610.

It is to be understood that the present invention is particularly useful in enterprise network systems. However, the present invention may be applicable to any system where monitoring of activity or use is performed. The management segment may be included in server 32 or any computer device, preferably providing the management services to that particular system.

Figure 7:
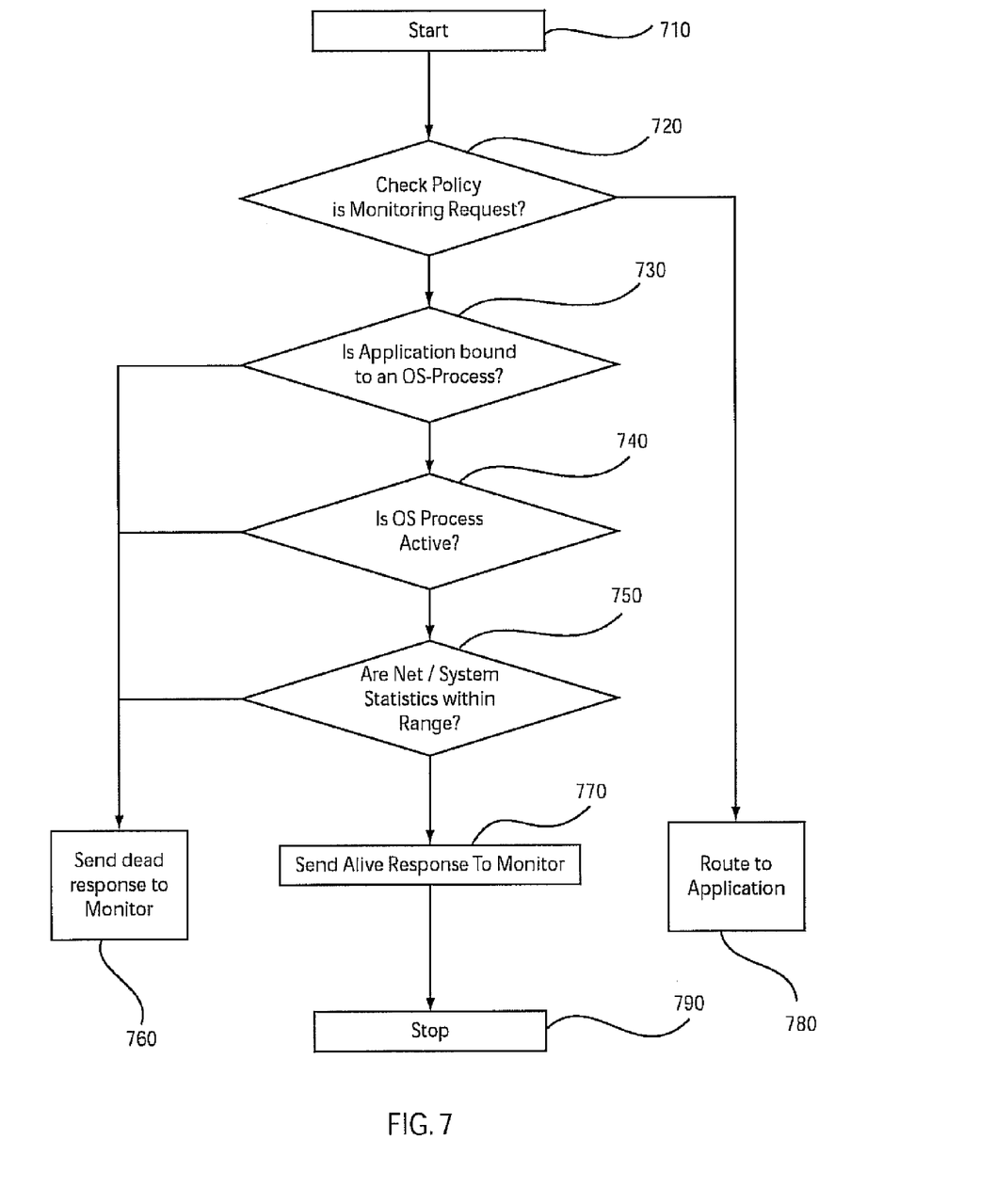
FIG. 7 is a block/flow diagram showing a system/method for responding to liveliness monitoring in a generic manner in accordance with an embodiment of the present invention.

Referring to FIG. 7, a block/flow diagram showing a system/method for generic application liveliness responder is illustratively depicted. The process is entered in block 710 when a liveliness monitoring request is received at a server where an application being monitored is running. These requests may include any of a plurality of requests needed for processing different applications or for monitoring activity of applications within the system. The request may originate from a server, a personal computer, a personal digital assistant or any other processing device that monitors one or more applications or devices in a system. The server monitors liveliness of a plurality of client applications distributed throughout a network.

In block 720, a determination is made whether the request has originated from a monitoring application or a regular user of the application. This determination may be performed by examining policies on routing of request messages. If the result from block 720 is positive, then block 730 is executed. Otherwise, block 780 is executed. In block 780, the requests are routed to the application that would normally process them. The requests are routed by employing a connection module which executes or performs the routing in accordance with policies. The routing is preferably performed other than on an application level of the management device. For example, the connection monitor may be located at an independent port or by employed at the operating system level (e.g., the network stack level) of the management device. If the request is routed to the application, the process terminates after the routing in step 780, otherwise it continues onto block 730.

In block 730, a determination is made if the application to which the monitoring request is made is associated with a process in the Operating System of the server. This determination can be made by examining the table of existing processes which is available in all operating systems. If no process is associated with the application, then execution proceeds to block 760. Otherwise execution proceeds to block 740.

In block 740, a determination is made if the process identified in previous block is active. The activity determination is made by looking at parameters such as the last time the process was running, the percentage of CPU cycles it has used in the recent past, the number of network packets it has sent out in the recent past, etc. If the process is determined to be active, execution proceeds to block 750. Otherwise, execution branches off to block 760.

In block 750, a determination is made whether the statistics regarding network packets, resource usage, number of system calls made, etc. of the OS process are within normal operating range of the process. If so, execution proceeds to block 770. Otherwise, execution branches off to block 760. The type of statistics to monitor may be driven by a set of policies. Policies may include how to response and what to respond with under a particular set of circumstances (e.g., for an email application activity may be measured based on a number of most recently sent or received emails, while another application may have activity measurement on the amount of processing power used or needed to perform a task or tasks, etc.).

In block 770, all monitoring requests for any and all applications (which are clients of the monitoring system) are responded to using the same generic application monitor, which bases responses on policies stored in the system. A positive response to the request is sent in this step.

In block 760, a negative response to the monitoring request is sent. After the execution of one of the steps 730, 740 or 750, the process terminates in step 790.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for determining liveliness of a monitored application, comprising:
   creating, by a processor, a set of exchange messages;
   creating a sequence of exchange messages;
   validating the sequence of exchange messages by sending and receiving messages to/from a connection monitor, wherein the connection monitor operates at a network stack level;
   forming reply messages, using a message responder, to send back in response to liveliness requests from application monitors; and
   determining whether to route the liveliness requests using a request router from the connection monitor to at least one of the message responder or to the monitored application depending on a set of policies, wherein the message responder and monitored application operate at an application layer on the same device as the connection monitor.

2. The method as recited in claim 1, wherein the set of exchange messages and the sequence of messages are determined in accordance with policies.

3. The method as recited in claim 2, further comprising updating the policies in accordance with changes in applications being monitored.

4. The method as recited in claim 1, wherein creating a set of exchange messages includes generating the exchange messages from a set of message templates.

5. The method as recited in claim 1, wherein the sequence of messages are generated from a set of sequence templates.

6. The method as recited in claim 1, wherein the request router is located within the network stack of a device running the monitored application.

7. The method as recited in claim 1, wherein the message responder runs on a port different from the port on which the monitored application runs.

8. The method as recited in claim 1, wherein the request router makes routing decisions on the basis of predetermined policies.

9. The method as recited in claim 1, wherein monitoring requests includes heartbeat requests from more than one application.

10. The method as recited in claim 1, wherein forming reply messages includes checking Operating System statistics to deter mine the liveliness of the monitored application.

11. The method as recited in claim 1, wherein forming reply messages includes checking network statistics of packets sent and received by an application to determine that the network statistics are within acceptable limits.

12. The method as recited in claim 1, wherein forming reply messages includes checking that an operating system associated with the monitored application is active.

13. The method as recited in claim 1, further comprising monitoring requests for all applications by using a same generic application liveliness responder to handle all requests to monitor.

14. A computer program product for determining liveliness of an application comprising a computer readable program stored on a non-transitory computer useable medium, wherein the computer readable program when executed on a computer causes the computer to perform the steps of:
   creating a set of exchange messages;
   creating a sequence of exchange messages;
   validating the sequence of exchange messages by sending and receiving messages to/from a connection monitor, wherein the connection monitor operates at a network stack level;
   forming reply messages, using a message responder, to send back in response to liveliness requests from application monitors; and
   determining whether to route the liveliness requests using a request router from the connection monitor to at least one of the message responder or to the monitored application depending on a set of policies, wherein the message responder and monitored application operate at an application layer on the same device as the connection monitor.

* * * * *